United States Patent
Birru (10) Patent No.: US 9,345,107 B2
(45) Date of Patent: May 17, 2016

(54) LIGHT LEVEL CONTROL FOR BUILDING ILLUMINATION

(75) Inventor: Dagnachew Birru, Yorktown Heights, NY (US)

(73) Assignee: Koninklijke Philips N.V., Eindhoven (NL)

(*) Notice: Subject to any disclaimer, the term of this patent is extended or adjusted under 35 U.S.C. 154(b) by 561 days.

(21) Appl. No.: 13/576,263

(22) PCT Filed: Feb. 7, 2011

(86) PCT No.: PCT/IB2011/050513
§ 371 (c)(1),
(2), (4) Date: Jul. 31, 2012

(87) PCT Pub. No.: WO2011/098945
PCT Pub. Date: Aug. 18, 2011

(65) Prior Publication Data
US 2012/0299486 A1    Nov. 29, 2012

Related U.S. Application Data

(60) Provisional application No. 61/303,473, filed on Feb. 11, 2010.

(51) Int. Cl.
*H05B 41/38* (2006.01)
*H05B 37/02* (2006.01)
*E06B 9/32* (2006.01)

(52) U.S. Cl.
CPC .......... *H05B 37/0218* (2013.01); *E06B 9/32* (2013.01); *Y02B 20/40* (2013.01); *Y02B 20/46* (2013.01)

(58) Field of Classification Search
USPC .......................................... 315/153
See application file for complete search history.

(56) References Cited

U.S. PATENT DOCUMENTS

| 5,237,168 | A | * | 8/1993 | Giust et al. | 250/214 AL |
| 5,237,169 | A | * | 8/1993 | Grehant | 250/214 AL |
| 5,701,058 | A | * | 12/1997 | Roth | 315/158 |
| 6,064,949 | A | * | 5/2000 | Werner et al. | 702/134 |

(Continued)

FOREIGN PATENT DOCUMENTS

| JP | 06111942 A | 4/1994 |
| WO | 2008135895 A2 | 11/2008 |

OTHER PUBLICATIONS

N.S.H. Brooks; "Multi-Variable Optimisation Within an Art Gallery Lighting Controller", Journal: Circuits and systems : Proc. of the 33rd Midwest symposium on Calgary, Alta., Canada, Aug. 12, 1990, New York, NY, XP010047928, pp. 677-680.

(Continued)

*Primary Examiner* — Ryan Jager (57) ABSTRACT

The present invention deals with light level control for building illumination by controlling electric lights and windows treatment. In an embodiment, the light level is controlled by a control system (2) operatively connected to at least one interior sensor (3) for detecting an interior light level; at least one electric light controller (4) for controlling the light level; at least one window treatment controller (5) for controlling the admittance level of daylight; and a processing unit (7) for handling control setpoints, including an interior light level setpoint. The level of the electric lights and the admitted level of daylight are controlled in parallel by operating the electric light controller and the window treatment controller.

10 Claims, 6 Drawing Sheets

(56) References Cited

U.S. PATENT DOCUMENTS

| | | | |
|---|---|---|---|
| 6,084,231 A * | 7/2000 | Popat | 250/214 AL |
| 6,388,404 B1 * | 5/2002 | Schnebly et al. | 318/16 |
| 7,566,137 B2 | 7/2009 | Veskovic | |
| 8,417,388 B2 * | 4/2013 | Altonen et al. | 700/278 |
| 8,571,719 B2 * | 10/2013 | Altonen et al. | 700/287 |
| 8,665,090 B2 * | 3/2014 | Bull | 340/539.26 |
| 8,866,343 B2 * | 10/2014 | Abraham et al. | 307/85 |
| 8,901,769 B2 * | 12/2014 | Altonen et al. | 307/31 |
| 2005/0110416 A1 * | 5/2005 | Veskovic | 315/149 |
| 2009/0243517 A1 * | 10/2009 | Verfuerth et al. | 315/315 |
| 2010/0012373 A1 * | 1/2010 | Guo et al. | 174/72 A |

OTHER PUBLICATIONS

E.S. Lee et al; "Integrated Performance of an Automated Venetian Blind/Electric Lighting System in a Full-Scale Private Office", Proc. of the ASHRAE/DOE/BTECC Conf., Thermal Performance of the Exterior Envelopes of Buildings VII, Clearwater Beach, FL, Dec. 7-11, 1998, pp. 1-25.

John Phelan; "Commissioning Lighting Control Systems for Daylighting Applications", National Conferance on Building Commissioning: May 8-10, 2002, pp. 1-11, Boulder, Colorado.

"Integrated Environmental Control and Monitoring in the Intelligent Workplace", DOE Grant No. DE-FC36-96601091.

N. S. H. Brooks; "Multi-Variable Optimissation Within an Art Gallery Lighting Controller", Circuits and Systems, Proceedings of the 33rd Midwest Symposium on Calgary, Alta., CA, Aug. 12-14, 1990, NY, NY IEEE, US, pp. 677-680, XP010047928.

* cited by examiner

LIGHT LEVEL CONTROL FOR BUILDING ILLUMINATION

FIELD OF THE INVENTION

The present invention relates to illuminating at least a portion of a building. In particular, it relates to a controlling the light level of at least a portion of a building by controlling electric lights and windows treatment.

BACKGROUND OF THE INVENTION

Modern buildings are often equipped with controllable window treatment, such as motorized shades or blinds, to control the amount of sunlight entering the building through openings, typically through windows. Moreover, modern buildings are often also equipped with controllable electric lights permitting to control the light level of individual or groups of electric lights fixtures. The light level control is typically achieved by dimmers. Generally it is beneficial to use the daylight as much as possible. For the occupants of the building, illumination by daylight normally leads to increased well-being. From an environmental as well as cost perspective, optimal use of daylight to illuminate the interior of a building may reduce the energy consumption of the building due to reduced electric lighting requirements. Moreover, optimal control may further lead to reduced heating and cooling requirements as well. In many situations, the window treatment and the electric lights are controlled manually and/or independently from each other, leading to sub-optimal use of the daylight.

U.S. Pat. No. 7,566,137 discloses an illumination maintenance system for maintaining a desired illumination profile in a building space, where the building space is illuminable by both daylight and electric light. The system comprises a sensor for sensing an illumination level of the space, a plurality of dimmable electric lamps to supplement the illumination of the space and a control system for controlling the dimming levels of the electric lamps. The control system adjusts the dimming level towards a preset that will result in a desired illumination profile in the space. Embodiments are disclosed which further implements controllable window treatment for selectively altering the amount of daylight entering the space.

There is nevertheless still a need in the art for improvements.

SUMMARY OF THE INVENTION

Building illumination systems of the prior art operate sequentially. In sequentially operation, the amount of daylight is first adjusted by operating the window treatment, after which the electrical light is adjusted to meet a given illuminating level setpoint. Such systems are often found dissatisfying by the user since sequential operation is slow and waiting time may be found intolerable. If the user is dissatisfied with the automatic control of the light level, there is a high risk that the user will revert to manual control which jeopardizes savings in the energy consumption obtained from automatic control.

It would be advantageous to achieve a control system for controlling the light level of the interior of at least a portion of a building which is capable of fast adjustment of the light level of the interior of at least a portion of a building. It would also be desirable to achieve a fully integrated and automated control system which is perceived by the user as a user-friendly system which assists in providing surrounding which are pleasant to be in. It would further be desirable to achieve a fully integrated and automated control system which supports to meet user setpoint requirements in an energy efficient way. In general, the invention preferably seeks to mitigate, alleviate or eliminate one or more of the above mentioned disadvantages singly or in any combination. In particular, it may be seen as an object of the present invention to provide a control system that solves the above mentioned problems, or other problems, of the prior art.

To better address one or more of these concerns, a control system is presented in a first aspect of the invention. The control system controls the light level of the interior of at least a portion of a building, the least portion of the building being illuminated by both daylight via one or more transparent portions and by generated light via one or more electric lights; the control system being operatively connected to:

at least one interior sensor for detecting an interior light level;

at least one electric light controller for controlling the light level of the one or more electric lights;

at least one window treatment controller for controlling the admittance level of daylight admitted through the one or more transparent portions; and a processing unit for handling control setpoints, the processing unit being operatively connected to the at least one interior sensor;

wherein the processing unit determines a difference between the detected interior light level and the interior light level setpoint, and wherein the light level of the one or more electric lights and the admittance level of daylight admitted through the one or more transparent portions are controlled in parallel by operating the at least one electric light controller and the at least one window treatment controller to, based on the difference between the detected interior light level and the interior light level setpoint, control the light level of the interior of at least the portion of the building.

By providing a control system which enables parallel operation of the at least one electric light controller and the at least one window treatment controller a fast system may be provided, since at least the electric light may be adjusted fast to meet the setpoints instantaneously or substantially instantaneously. In particular, in a situation where the operation of the windows treatment takes longer time, the electric lights may be operated to accommodate the window treatment so that the user experiences that the reduction of the difference is obtained in a short time.

By operating the at least one electric light controller and the at least one window treatment controller based on the difference between the detected interior light level and the interior light level setpoint, the system operates based on the actual light level of the surroundings the user is positioned in. The actual light level of the surroundings is typically of paramount importance in relation to whether or not the surroundings are experienced to be pleasant to be situated in. Prolonged stays in surroundings with a light level that is perceived to be non-optimal typically leads to dissatisfaction. By basing the control on the difference between the detected interior light level and the interior light level setpoint, the system operates on the actual light level experienced by the user, and the present system is less prone to user dissatisfaction and the user is less likely to shift to manual control.

In an advantageous embodiment the at least one electric light controller and the at least one window treatment controller are operated to reduce the difference between the detected interior light level and the interior light level setpoint. By basing the control on reducing this different, integral operation may be used which fast and robust accommodates the actual light level to the light level of the setpoint.

In an advantageous embodiment, the at least one electric light controller and the at least one window treatment controller are operated with an output that is proportional to the difference between the detected interior light level and the interior light level setpoint. By basing the control on proportional operation, the light level may fast accommodate the actual light level to the light level of the setpoint.

In an advantageous embodiment, the at least one electric light controller and the at least one window treatment controller are operatively connected so that the at least one electric light controller receives operational information from the at least one window treatment controller, and/or vice versa; and wherein the at least one electric light controller is operated based on the received information from the at least one window treatment controller, and/or the at least one window treatment controller is operated based on the received information from the at least one electric light controller. By sharing operational information between the two types of controllers, a fully integrated system may be provided where information already available at one subunit may be used at another subunit, thereby providing a system which supports detailed control. The operational information may be such information as the dimming level of light fixtures and the fraction of admitted light through the window treatment.

In an advantageous embodiment, the parallel operation of the at least one electric light controller and the at least one window treatment controller comprises operating the at least one window treatment controller toward an admittance level defined by the control setpoints and operating the at least one electric light controller to reduce the difference between the detected interior light level and the interior light level setpoint. Window treatment operates with longer time constants than electric lights. In situations where a specific admittance level of the window treatment is desired, such as in connections with glare problems, either directly from the sun or from reflections of sunlight, the user may operate the windows treatment to a desired position while still maintaining a substantial constant light level.

It is an advantage of embodiments of the present invention that the control system supports to operate the electric lights and the window treatment based on additional criteria. In an advantageous embodiment, such an additional criterion is based operating the electric lights in an energy efficient manner. In an embodiment, this is achieved by having the processing unit to further determines a measure of the energy consumption of the electric lights, and wherein the light level of the one or more electric lights and the admittance level of daylight admitted through the one or more transparent portions are controlled by reducing difference between the detected interior light level and the interior light level setpoint and by reducing the energy consumption of the electric lights.

It is an advantage of the present invention that it supports decentralized as well as centralized operation. There are advantages and disadvantages of both types of operation, which may depend on the given situation of use. Embodiments of the present invention is not limited to any of them thereby provided a versatile system which may be used in connection with a large number of general building operational systems.

In advantageous embodiments of the present invention, the electric light controllers and the window treatment controllers are communicative connected by a communication link. In principle any suitable communication link may be used, such a local dedicated connection, or a backbone network such as the enterprise network for data and/or building controls. It is an advantage of the present invention that it is not dependent on the specific implementation of a given communication, thus rendering it a versatile system.

In advantageous embodiments of the present invention, the operation of the system is further based on input from at least one exterior sensor for detecting a daylight level, an even better control of the light level may be provided. In an advantageous embodiment, the available daylight is used to control the window treatment. In other advantageous embodiments, the exterior sensor reading may be used to implement glare detection which in turn may be used to automatically control the windows treatment to avoid glare effects which are very bothersome for the user of the building. Reference to the sensor as exterior sensor, does not imply that the sensor is placed at an exterior position, the sensor may be placed inside or outside depending on the specific implementations as long as the sensor can detect an exterior light level, that is the daylight level.

In advantageous embodiments of the present invention, the operation of the system is further based on the use of occupancy sensors for detecting the presence of a person in the room, the illumination system may be operated in accordance with rules which define operational settings depending on whether or not a person is in the room or not. Such rules may in a simple form be a time setting defining a period from the last occupant has left a room until the light is shut off. This may minimize energy consumption since the electric light may be shut off if there is nobody in the room.

In accordance with a second aspect of the invention, an illumination system is presented. The illumination system comprises:

at least one interior sensor for detecting an interior light level;

at least one electric light controller for controlling the light level of the one or more electric lights;

at least one window treatment controller for controlling the admittance level of daylight admitted through the one or more transparent portions;

a processing unit for handling control setpoints, the control setpoints comprises an interior light level setpoint, the processing unit being operatively connected to the at least one interior sensor; and a control unit for controlling the light level of the interior of the at least portion of the building;

wherein the control unit operates the processing unit to determine a difference between the detected interior light level and the interior light level setpoint, and wherein the light level of the one or more electric lights and the admittance level of daylight admitted through the one or more transparent portions are controlled in parallel by operating the at least one electric light controller and the at least one window treatment controller to, based on the difference between the detected interior light level and the interior light level setpoint, control the light level of the interior of at least the portion of the building.

In accordance with a third aspect of the invention, a method of operating an illumination system is presented. The method comprises:

receiving control setpoints, the control setpoints comprises an interior light level setpoint;

detecting an interior light level;

controlling the light level of the one or more electric lights; and controlling at least one windows treatment to set an admittance level of daylight admitted through one or more transparent portions;

wherein the light level of the one or more electric lights and the admittance level of daylight admitted through the one or more transparent portions are controlled in parallel by operating the at least one electric light and the at least one window treatment to, based on the difference between the detected interior light level and the interior light level setpoint, control the light level of the interior of at least the portion of the building.

The method may advantageously be implemented in a computer program product for, when running on a computer, controlling an illumination system in accordance with the first, second and/or third aspect of the invention.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 schematically illustrates an embodiment of an illumination system for illuminating the interior of a building.

DESCRIPTION OF EMBODIMENTS

Figure 1:
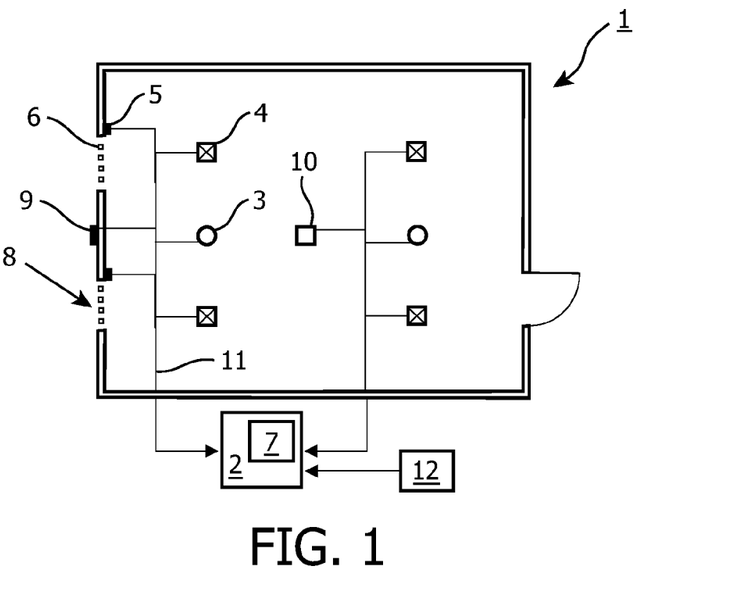

FIG. 1 schematically illustrates an embodiment of an illumination system for illuminating the interior of a building 1, here exemplified by a floor plan of a room. The illumination system comprises a control system 2 operatively connected to interior sensors 3 for detecting an interior light level, to electric light controllers 4 for controlling the light level of an electric light to which it is connected and window treatment controllers 5 for controlling window treatment 6 to adjust the admittance level of daylight admitted through transparent portions, here in the form of two windows 8. The windows treatment is typically in the form of shades or blinds. In an embodiment, the control system is in the form of a control unit operatively connected to a processing unit 7. The system further comprises an exterior sensor 9 for detecting a daylight level. The exterior sensor 9 is illustrated to be positioned on the outside of the building. However, the sensor may also be placed inside in a position, such as behind the window treatment, where it can detect the exterior light level. The figure moreover illustrates an occupancy sensor 10 for detecting the presence of a person in the room, and a communication link 11. The control system is illustrated as a single entity. It is however understood that it can be implemented in any suitable way, typically either as a central system or as a distributed system. In a distributed system, the processing unit may be distributed over at least one or more electric light controllers, one or more windows treatment controllers and one or more user interfaces. The operation of the control system may be based on instruction provided by means of a computer program product 12, such as a computer code provided in any form and by any means.

It is to be understood that the specific details of FIG. 1 is provided for illustrative reasons. In general the illumination system may be provided in connection with any type of building comprising any type of floor plan. The building may be subdivided into portions, such as into zones where the electric light of a zone is controlled in an independent manner. For example the four electric lights and the two window treatments may be controlled collectively, based on an average of the light level detected by the two interior sensor readings. In general a building may be divided into any number of partitions where the light level is controlled collectively based on operating any number of window treatments and any number of electric lights, based on sensor readings from any number of interior sensors. If more than one sensor is used to collectively control a group of electric lights, a combined sensor signal may be generated. The combined sensor signal may be an average signal, a weighted signal, or any other suitable signal. The number of light fixtures and window treatments will depend on a particular application.

Figure 2A:
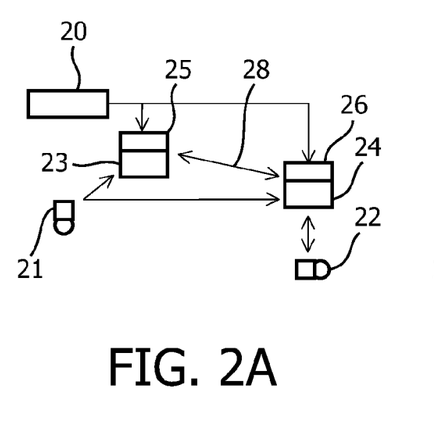
FIGS. 2A and 2B illustrate block diagrams of two embodiments of the overall control layout.
Figure 2B:
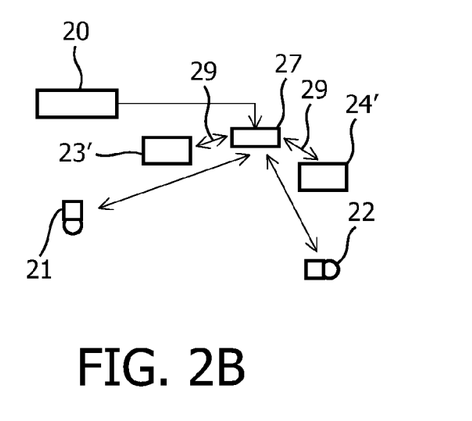

FIGS. 2A and 2B illustrates block diagrams of two embodiments of the overall control layout. FIG. 2A illustrates an embodiment employing decentralized control, whereas FIG. 2B illustrates an embodiment employing centralized control.

In FIG. 2, input values or signals are received from three providers: input values derived from setpoint values 20, input value derived from sensor readings from an interior sensor 21 and input values derived from sensor readings from an exterior sensor 22. The setpoints 20 may be based on a combination of user settings and more general control settings. The sensors are typically in the form of photosensors capable of detecting an illumination level. The illumination level is generally expressed as a given lux level. Based on the input, the electric lights 23, 23' and the window treatment 24, 24' are controlled by use of controllers, either in the form of dedicated controllers 25, 26 or a shared central controller 27. In embodiments, the electric light controllers control a dimming level of the light fixtures, and the window treatment controller control a window treatment motor.

In the illustrated embodiment, the electric light controller and the window treatment controller are operatively connected 28, 29 so that operational information may be shared, so that the electric light can be operated based on received information the from the window treatment, and/or vice versa.

Figure 3:
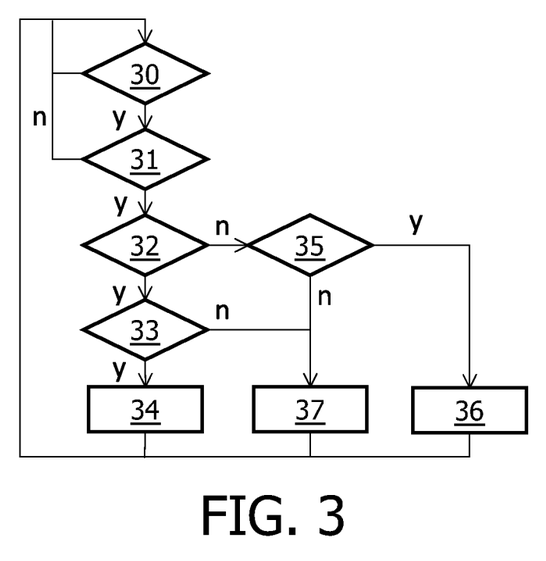
FIG. 3 illustrates a simplified general flow chart implementing a control loop performed by the window treatment controller.
Figure 4A:
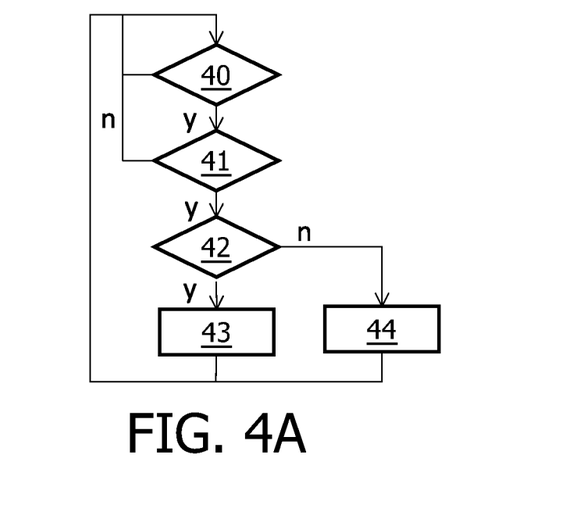
FIGS. 4A and 4B illustrate simplified general flow charts implementing control loops performed by the electric light controller.
Figure 4B:
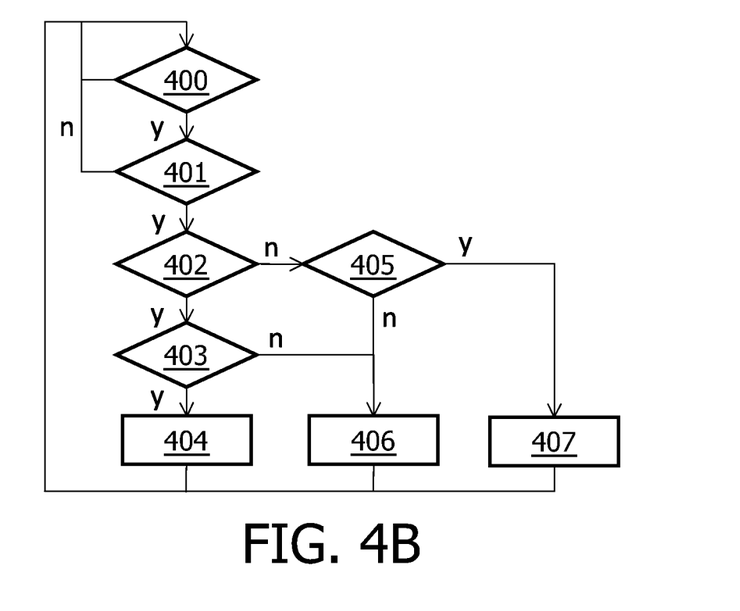

FIG. 3 illustrates a simplified general flow chart implementing a control loop performed by the window treatment controller in a situation where the electric light controller shares operational information in the form of the status of the dimming level with the window treatment controller, so that the window treatment can be operated in dependence on this status In the flow charts of FIGS. 3 and 4 "yes" are abbreviated with a "y", and "no" are abbreviated with an "n".

An initial open loop is set to detect if the windows treatment system is:

30: set in automatic mode.

If yes,

31: detect if the setpoint is not met, or if the windows treatment is not fully open and the electric light is on.

If the windows treatment is fully open the windows treatment cannot be operated to provide more light. Therefore, if the answer to the above condition is no, the system is instructed to go back to detect whether or not automatic mode is set 30. If the answer to the above condition (31) is yes, the following control sequence is performed:

32: Determine if the electric light is off;
if yes,
33: determine if the light level in the room is higher than the target level defined by the setpoints. That is, it is determined if the difference between the detected interior light level and the interior light level setpoint is positive or negative. If the detected light level is higher than the setpoint level, then;
34: decrease the admittance level of the window treatment.
If at 32 it is determined that the electric lights is on;
35: it is also determined if the light level in the room is higher than the target level defined by the setpoints. However, in this case, if the light level is too high:
36: the admittance level of the window treatment is decreased slowly; otherwise:
37: the admittance level of the window treatment is increased.

FIG. 4A illustrates a simplified general flow chart implementing a control loop performed by the electric light controller in a situation where the electric light controller does not receive information about the status of the windows treatment controller.

An initial open loop is set to detect if the electric light control is:
40: set in automatic mode.
If yes,
41: detect if the setpoint is not met
If the answer to the above condition (41) is yes, the following control sequence is performed:
42: determine if the light level in the room is higher than the target level defined by the setpoints. That is, it is determined if the difference between the detected interior light level and the interior light level setpoint is positive or negative. If the detected light level is higher than the setpoint level, then:
43: decrease the level of generated electric light, e.g. by increasing the dimming level.
However if the detected light level is not higher than the setpoint level, then:
44: increase the level of generated electric light, e.g. by decreasing the dimming level.

FIG. 4B illustrates a simplified general flow chart implementing a control loop performed by the electric light controller in a situation where the electric light controller receives information about the status of the windows treatment controller, so that the electric lights can be operated in dependence on this status An initial open loop is set to detect if the electric light system is:
400: set in automatic mode.
If yes,
401: detect if the setpoint is not met, or if the windows treatment is not fully open and the electric light is on.
If the answer to the above condition (401) is yes, the following control sequence is performed:
402: Determine if the windows treatment is at maximal admittance level;
if yes,
403: determine if the light level in the room is higher than the target level defined by the setpoints. That is, it is determined if the difference between the detected interior light level and the interior light level setpoint is positive or negative. If the detected light level is higher than the setpoint level, then;
404: decrease the electric light level, e.g. by increasing the dimming.

If at 402 it is determined that the windows treatment is not at maximal admittance level;
405: it is also determined if the light level in the room is higher than the target level defined by the setpoints. However, in this case, if the light level is too high:
406: the electric light level is increased, e.g. by decreasing the dimming; otherwise:
407: the electric light level is increased slowly, e.g. by decreasing the dimming slowly.

In the following two embodiments are disclosed in further detail, where the control system is implemented by defining a cost function that minimizes the difference between the detected interior light level and an interior light level setpoint. In the below examples, the cost function comprises, in addition to the difference between the detected interior light level and an interior light level setpoint, also a contribution of the energy consumption of the electric lights, so that electric lights and the window treatment are controlled by reducing both the difference between the detected interior light level and the interior light level setpoint and by reducing the energy consumption of the electric lights.

The electric light controller and the window treatment controller may in embodiments be implemented to adaptively control the light level, based on a gradient decent algorithm which minimizes a cost function. The cost function may be constructed to comprise a contribution from the light level difference and from the energy consumption. The light level difference is hereafter also referred to as the lighting error. The below equations Eq. 1 and Eq. 2 adaptively reduces both the lighting error and the energy consumption:

$$x(n) = x(n-1) - \mu_1 \frac{\partial \|e(n)\|^2}{\partial x} - \mu_2 \frac{\partial \|E(n)\|^2}{\partial x}, \quad \text{Eq. 1}$$

$$w(n) = w(n-1) - \mu_3 \frac{\partial \|e(n)\|^2}{\partial w} - \mu_4 \frac{\partial \|E(n)\|^2}{\partial w}, \quad \text{Eq. 2}$$

where $x(n)$ and $w(n)$ represent the electric light setting and the window treatment setting, respectively. The parameter n represent the sample time. In the analogue situation, n would be interchanged with the time t. The function $e(n)$ expresses the difference between the user setpoint and the measured interior light level, $e(n)$ is thus the lighting error. The function $E(n)$ represents the energy consumption. The μ's are positive constants defining the adaptations step sizes. The equations thus define the amounts by which the electric lights and the window treatment will be adjusted for each adaptive control cycle.

The lighting error can further be described as:

$$e(n) = y(n) - u$$

where u defines the desired user setpoint and $y(n)$ is the interior lighting sensor reading. The interior light can be described as:

$$y(n) = dl(n)w(n) + x(n)$$

where $dl(n)$ is the available daylight level as determined from the exterior light sensor reading. The energy consumption of the electric lights can be set to be proportional with) $x(n)$, this leads to:

$$E(n) \propto x(n) \propto y(n) - dl(n)w(n)$$

Using the above relationships, Eq. 1 and Eq. 2 can be simplified to Eq. 3 and Eq. 4:

$$x(n)=x(n-1)-\mu_1 e(n)-\mu_2 x(n),\quad\text{Eq. 3}$$

$$w(n)=w(n-1)-\mu_3 e(n)dl(n)+\mu_4 x(n),\quad\text{Eq. 4}$$

The presence of x(n) and w(n) in both equations ensures that the control of the electric light and the window treatment are integrated with each other. Moreover, a control algorithm implementing the above Eq. 3 and Eq. 4 permit parallel operation without the need for a sequential operation, even though time constants for the electric light and for the window treatment will be different. The parallel adaptive system will still operate correctly due to the true parallel operation.

A control algorithm based on Eq. 1 and Eq. 2 (or Eq. 3 and Eq. 4) balances reducing the energy consumption and meeting the user setpoints. This may lead to that user setpoint cannot always be completely met in order to save energy. Such a situation is when the daylight is insufficient to meet the light level requirement and the electric light should therefore be increased substantially. In this case, the control system may set the light level to a low level to save energy. This is not always acceptable to a user. In another embodiment, as described below based on Eq. 5 and Eq. 6 as defined below, meeting user setpoints is prioritized but the energy consumption is still reduced. In an embodiment, this may be achieved by adaptively reduce the lighting error and the energy consumption as follows:

$$x(n) = x(n-1) - \mu_1 \frac{\partial \|e(n)\|^2}{\partial x},\quad\text{Eq. 5}$$

$$w(n) = w(n-1) - \mu_3 \frac{\partial \|e(n)\|^2}{\partial w} - \mu_4 \frac{\partial \|E(n)\|^2}{\partial w},\quad\text{Eq. 6}$$

which, in a similar manner as in connection with Eq. 1 and Eq. 2, can be simplified to Eq. 7 and Eq. 8:

$$x(n)=x(n-1)-\mu_1 e(n),\quad\text{Eq. 7}$$

$$w(n)=w(n-1)-\mu_3 e(n)dl(n)+\mu_4 x(n),\quad\text{Eq. 8}$$

With these control equations, the lighting controller simply attempts to meet user setpoints (i.e. reducing the lighting error), however the window treatment controller attempts to reduce both, i.e. reduce the lighting error and force the electric light to save energy by admitting as much light as possible through the windows so that the electric lights will dim accordingly.

In a given illumination system, a number of different control algorithms may be selected via a user interface, so that the responsible for the illumination system may select either to control the entire illumination system based on a common algorithm or sections of the building may be controlled based on different algorithms.

In other embodiments, the control algorithm may be based on proportional control where the outputs of the electric light controller and the windows treatment controller are proportional to the difference between the detected interior light level and the interior light level setpoint, that is proportional to the lighting error function e(n).

Figure 5:
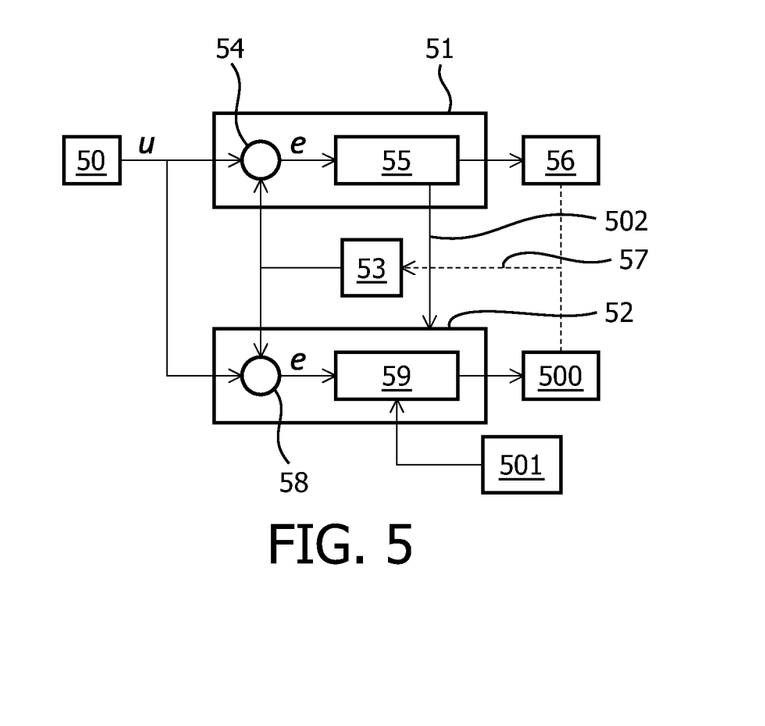
FIG. 5 illustrates a simplified block diagram of a control system implementing a decentralized control algorithm.

FIG. 5 illustrates a simplified block diagram of a control system implementing a control algorithm based on Eq. 7 and Eq. 8 in the embodiment of FIG. 2A, i.e. in a decentralized control system. Thus each of, or a group of, electric lights and each of, or a group of window treatments, are controlled by a decentralized controller. In the illustrated embodiment, each electric light controller and each window treatment controller comprises their own controller.

A user, typically by use of a user interface, such a remote control, a computer or a wall mounted interface, set a required light level, u, 50, e.g. by setting a setpoint to a desired lux value. The user setpoint is input into the light controller 51 and into the window treatment controller 52. In addition also the sensor reading from the interior light sensor 53 is input into the two controllers. The electric light controller 51 determines the lighting error, e, in a first processing step 54, and the lighting error is subsequently used to determine the electric light control variable (e.g. a value repressing the dimming level) x(n) at a next processing step 55 by use of Eq. 7. x(n) is output to the electric light 56 to set the light level. Moreover, x(n) is output 502 to the windows treatment controller. The adjusted light level will influence the subsequent interior light sensor reading 57.

In parallel, i.e. simultaneously with or concurrently with, operating the electric lights, the window treatment controller 52 also determines (or receives) the lighting error, e, in a first processing step 58, and the lighting error is subsequently used to determine the windows treatment control variable (e.g. a value repressing blind position) further based on the received x(n) as well as on the received sensor reading from the exterior sensor 501 to determine dl(n). The windows treatment control variable is determined at a next processing step 59 by use of Eq. 8. w(n) is output to the windows treatment 500 to set the admittance level. Again, the adjusted light level will influence the subsequent interior light sensor reading 57.

Figure 6:
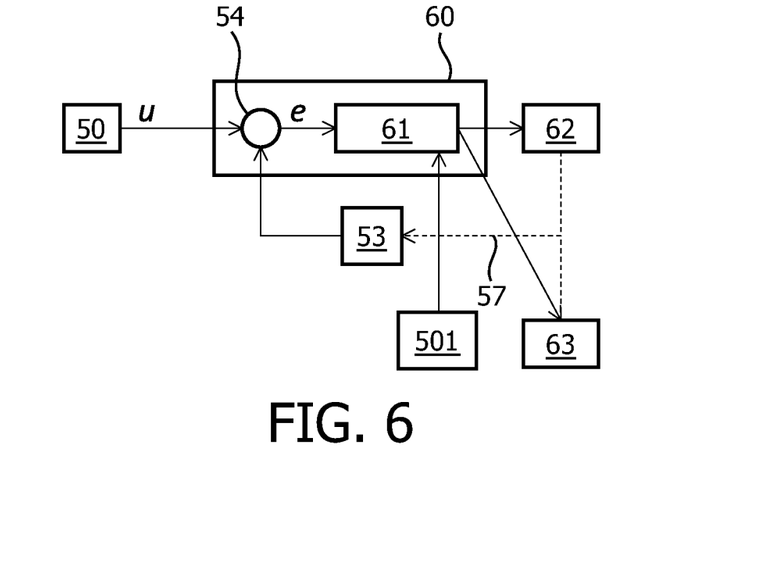
FIG. 6 illustrates a simplified block diagram of a control system implementing a centralized control algorithm.

FIG. 6 illustrates a simplified block diagram of a control system implementing a control algorithm based on Eq. 7 and Eq. 8 in the embodiment of FIG. 2B, i.e. in a centralized control system. Thus a central processing unit controls the electric lights and the window treatments by forwarding control settings.

As in connection with FIG. 5 a user sets a required light level, u, 50. The user setpoint is input into the central controller 60 together with sensor reading from the interior light sensor 53 and sensor reading from the exterior light sensor 501. The central light controller 60 determines the lighting error, e, in a first processing step 54. The lighting error and the sensor reading from the external sensor are subsequently used to determine the electric light control variable x(n) and the windows treatment control variable w(n) at a next processing step 61 by use of Eq. 7 and Eq. 8. The determined x(n) and w(n) are output to the electric light 62 to set the light level and to the windows treatment controller 63 to set the admittance level. The adjusted light level will influence the subsequent interior light sensor reading 57.

The parallel operation is obvious in this situation, since the central controller deals with both control equations simultaneously.

Figure 7:
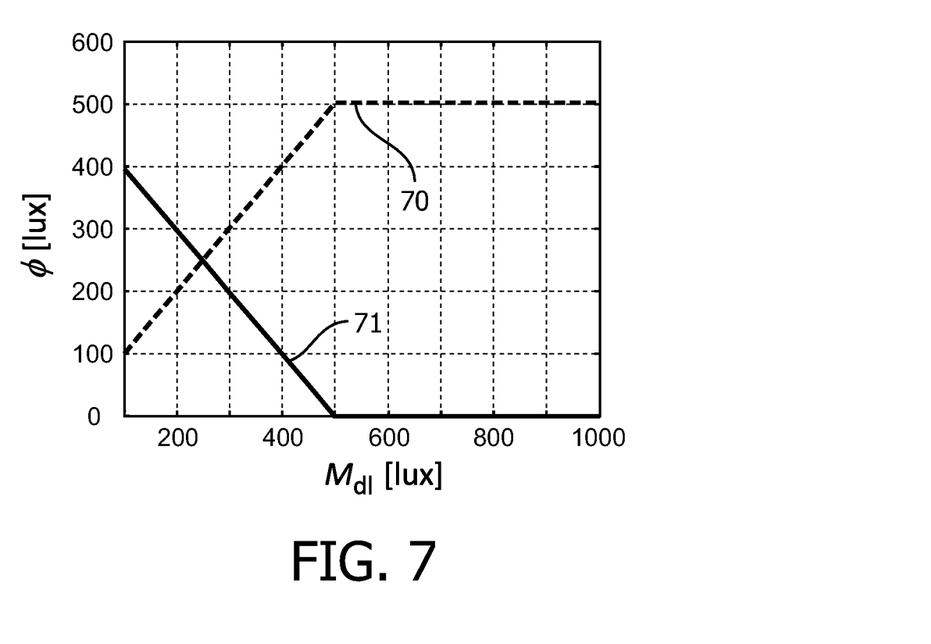
FIGS. 7 to 9 illustrates a graphs showing simulated results of systems in accordance with embodiments of the present invention.

FIG. 7 illustrates a graph showing simulated results of a system in accordance with embodiments of the present invention. This and the below disclosed simulations have been performed by implementing FIG. 5 into MatLab. The figure illustrates the light level contribution φ [lux] from the daylight and the electric light respectively as a function of the maximum daylight availability $M_{dl}$ [lux]. The graph illustrates a situation where the electric light is limited to outputting 1000 lux with variable daylight, in a situation where the user setpoint is 500 lux. The graph shows the contribution from the daylight 70 and the contribution from the electric light 71. It can be seen, that as more daylight is available, the portion of electric light is reduced, thereby reducing the energy consumption. Electric light is only used when there is not sufficiently daylight.

Figure 8:
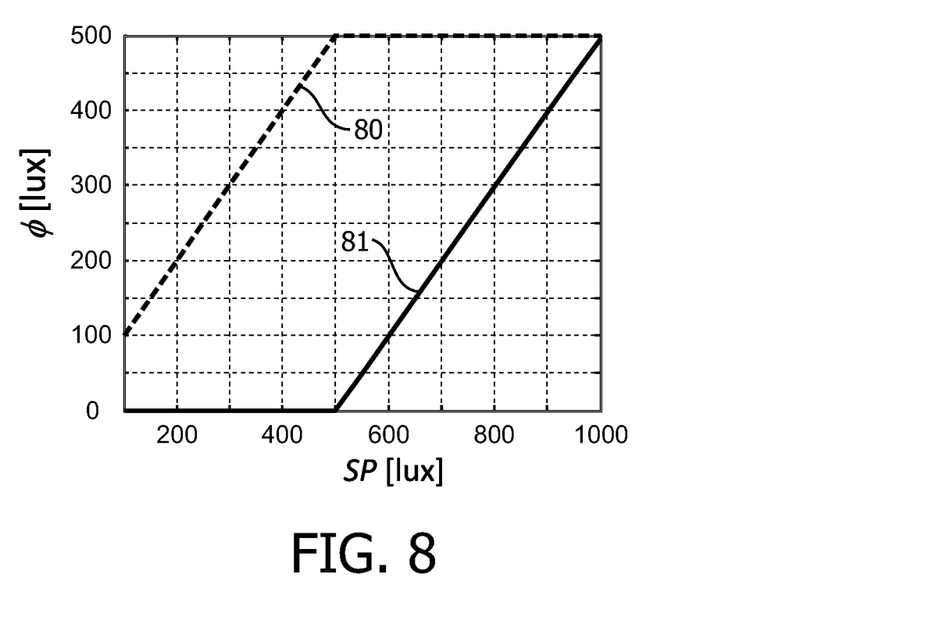

FIG. 8 illustrates a graph showing simulated results of a system in accordance with embodiments of the present invention, similar to FIG. 7, except that the figure illustrates the light level contribution, φ [lux], as a function of the user setpoint SP [lux]. The graph illustrates a situation where the daylight is limited to 500 lux. The graph shows the contribution from the daylight 80 and the contribution from the electric light 81. It can be seen, that when daylight is not available to meet the user setpoint, electric lights are used to a minimum possible.

Figure 9:
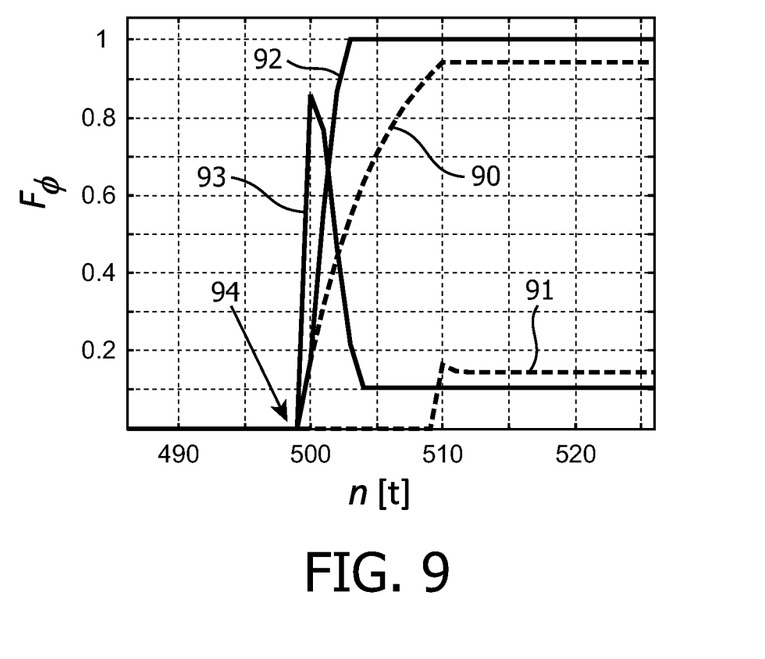

FIG. 9 illustrates a graph showing simulated performance of the close loop adaptive sequential system compared to the performance of a parallel operated system in accordance with embodiments of the present invention. The figure shows the normalized portion of admitted light, $F_\phi$, for sequential windows treatment control 90, sequential electrical light control 91, parallel windows treatment control in accordance with embodiments of the present invention 92, and parallel electrical light control in accordance with embodiments of the present invention 93, all as a function of the sample time n [t]. The Figure illustrates the situation where the setpoint is increased at 94. The changes in setpoint can be due to user setpoint or in response to the occupancy sensor detecting the presence of a person. The sequential system takes longer time to converge, while a system in accordance with embodiments of the present invention reacts to the changed setpoint instantly. With the present system, the room is first illuminated for a brief period with the electric lights while the window treatment admit more and more daylight, then the electric light dim accordingly to the minimum possible. With the sequential system, electric lights will wait until the blinds open fully before they start to supplement the required light.

Figure 10:
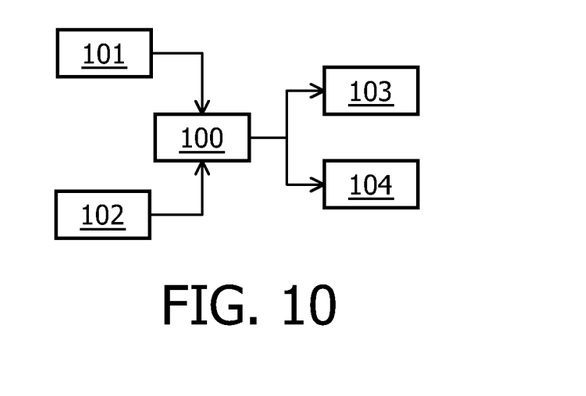
FIG. 10 illustrates a general flow diagram to illustrate general steps performed in connection with embodiments of the present invention.

FIG. 10 illustrates a general flow diagram to illustrate general steps performed in connection with embodiments of the present invention.

The method illustrates a control algorithm 100 which is implemented to receive control setpoints 101, the control setpoints comprises an interior light level setpoint, and to detect or receive an interior light level 102. Based on the inputs/readings, the control algorithm controls the light level of the one or more electric lights 103 and the admittance level of at least one windows treatment 104. The light level and the admittance level are controlled in parallel to reduce the difference between the detected interior light level 102 and the interior light level setpoint 101.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A control system for controlling the light level of the interior of at least a portion of a building, the at least a portion of the building being illuminated by both daylight via one or more transparent portions and by generated light via one or more electric lights; the control system being operatively connected to:
   at least one interior sensor for detecting an interior light level;
   at least one electric light controller for controlling the light level of the one or more electric lights;
   at least one window treatment controller for controlling the admittance level of daylight admitted through the one or more transparent portions; and
   a processing unit for handling control setpoints, the control setpoints comprising an interior light level setpoint, the processing unit being operatively connected to the at least one interior sensor;
   wherein the processing unit determines a difference between the detected interior light level and the interior light level setpoint, and wherein the light level of the one or more electric lights and the admittance level of daylight admitted through the one or more transparent portions are controlled in parallel by operating the at least one electric light controller and the at least one window treatment controller to, based on the difference between the detected interior light level and the interior light level setpoint, control the light level of the interior of at least the portion of the building,
   wherein the at least one electric light controller receives a level of admitted light through the window treatment from the at least one window treatment controller;
   wherein the at least one window treatment controller receives a status of dimming level from the at least one electric light controller; and
   wherein the at least one electric light controller is operated based on the received level of admitted light through the window treatment from the at least one window treatment controller, and/or the at least one window treatment controller is operated based on the received status of dimming level from the at least one electric light controller.

2. The control system according to claim 1, wherein the at least one electric light controller and the at least one window treatment controller are operated to reduce the difference between the detected interior light level and the interior light level setpoint.

3. The control system according to claim 1, wherein the at least one electric light controller and the at least one window treatment controller are operated with an output that is proportional to the difference between the detected interior light level and the interior light level setpoint.

4. The control system according to claim 1, wherein the parallel operation of the at least one electric light controller and the at least one window treatment controller comprises operating the at least one window treatment controller toward an admittance level defined by the control setpoints and operating the at least one electric light controller to reduce the difference between the detected interior light level and the interior light level setpoint.

5. The control system according to claim 1, wherein the processing unit further determines a measure of the energy consumption of the electric lights, and wherein the light level of the one or more electric lights and the admittance level of daylight admitted through the one or more transparent portions are controlled by reducing the difference between the detected interior light level and the interior light level setpoint and by reducing the energy consumption of the electric lights.

6. The control system according to claim 1, wherein at least one of the at least one electric light controller and the at least one window treatment controller comprises a local processing unit for decentralized control of at least one of the light level of the one or more electric lights and the admittance level of daylight admitted through the one or more transparent portions.

7. The control system according to claim 1, further being operatively connected to a central control unit for controlling at least one of the at least one electric light controller and the at least one window treatment controller for centralized control of at least one of the light level of the one or more electric lights and the admittance level of daylight admitted through the one or more transparent portions.

8. The control system according to claim 1, wherein the at least one electric light controller and the at least one window treatment controller are communicative connected by a communication link.

9. The control system according to claim 1, further being operatively connected to at least one exterior sensor for detecting a daylight level.

10. The control system according to claim 1, further being operatively connected to one or more occupancy sensors for detecting the presence of a person in a region of the building.

* * * * *